United States Patent
Liang et al.

(10) Patent No.: US 7,707,017 B2
(45) Date of Patent: Apr. 27, 2010

(54) SYSTEM MODELING FACILITATING METHOD AND APPARATUS

(75) Inventors: Haiqi Liang, Beijing (CN); Dong Liu, Beijing (CN); Ying Liu, Beijing (CN); Zhong Tian, Beijing (CN); Jian Wang, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 11/441,625

(22) Filed: May 26, 2006

(65) Prior Publication Data

US 2006/0282241 A1   Dec. 14, 2006

(30) Foreign Application Priority Data

May 27, 2005   (CN) .................. 2005 1 0075980

(51) Int. Cl.
  G06G 7/48   (2006.01)
  G06F 9/46   (2006.01)
(52) U.S. Cl. ............................. 703/6; 705/8
(58) Field of Classification Search ............. 703/6; 705/8
  See application file for complete search history.

(56) References Cited

U.S. PATENT DOCUMENTS

| | | | |
|---|---|---|---|
| 5,987,423 A * | 11/1999 | Arnold et al. | 705/14 |
| 6,308,163 B1 | 10/2001 | Du | |
| 6,584,475 B1 * | 6/2003 | Carey et al. | 707/203 |
| 7,328,233 B2 * | 2/2008 | Salim et al. | 709/202 |
| 2002/0138324 A1 * | 9/2002 | Zarefoss et al. | 705/8 |
| 2003/0187743 A1 | 10/2003 | Kumaran | |

* cited by examiner

*Primary Examiner*—Paul L Rodriguez
*Assistant Examiner*—Dwin M Craig
(74) *Attorney, Agent, or Firm*—Kenneth R. Corsello; Anne Vachon Dougherty

(57) ABSTRACT

A system modeling facilitating method and apparatus, wherein, entities and interactions among the entities are introduced gradually starting from critical entities in a system to form an abstract view of the entities. An associated sub-module is built for at least one of the entities and interfaces to other entities are formed for the sub-module. Representations of behaviors and logical relations among the behaviors, as well as links between its interfaces and representations of behaviors are built. When an entity is extended to be a sub-module, other entities appear in abstract form, forming a local view of sub-module together with the other entities shown in abstract form. A global view can be formed by combining the sub-modules depicted in the local view based on the interaction described in the abstract view.

16 Claims, 15 Drawing Sheets

SYSTEM MODELING FACILITATING METHOD AND APPARATUS

FIELD OF THE INTION

The present invention relates to a system modeling facilitating method and apparatus.

DESCRIPTION OF THE BACKGROUND ART

Today's business processes are too complex to model. A business process usually involves the participation of multiple roles/entities, including human, systems, external entities, and so on, with complex interactions among the roles/entities, usually in the form of information exchange. An integrated picture of a complex business process is very important for both communication and analysis purpose. However, it is very hard to obtain such an integrated picture in practice, because no single person has a global knowledge on the whole business operation from a macroscopic view to a microscopic view, and in fact every role involved in a business process only knows their own parts of the business relatively clearly. Thus, it is hard to collect these pieces of fragment information together to generate a complete business process diagram. At the same time, when collecting these pieces of fragmentary information, preserving consistency among them and managing various changes are also very difficult. While the scale of the business process increases, the difficulty to capture and represent it soars significantly. So how to effectively capture complex business processes in an integrated way is a very critical and indispensable part of today's enterprise business process reengineering, business process automation, and system integration.

Current Business Process Modeling Tools comprise UML activity diagram; Microsoft Visio, iGrafx FlowCharter, SmartDraw; and WBI Modeler, and so on. All of the available business process modeling methods/tools are either focused on modeling simple flow charts only, or designed with an assumption that all critical people participating the business process can come together to complete the integrated business process modeling. However, the problem lies in that usually it isn't realistic to gather all the involved people together from different departments or different working sites of an enterprise.

Thus, the business process can only be captured manually and recorded on a piece of paper. Business consultants can interview people at different levels of position to gather fragment information on different levels. For example, CxO-level people are interviewed to get overall information on a certain business process and low-level people are interviewed to get the details of a certain local part in the business process. The consultants can record these pieces of information on a piece of paper, or they can also utilize the above mentioned business process modeling tools, and take the interview results home to process, and finally generate a comprehensive description of a customer's business process. The consultants can also confirm this description with customer.

In the above business requirement gathering cycle, the information obtained from different people is often mismatched. It is difficult to put these fragments together because of the lack of an interface agreement among them. The key reason is the lack of a systematic approach and effective supporting tools in the whole cycle.

A method and system for process brokering and contents aggregation in collaborative business process management are disclosed in U.S. Patent Application Publication U.S. 2003/0187743 A1, wherein Process Brokering Services (PBS) are implemented through the concept of Adaptive Documents to facilitate e-commerce. In the U.S. Patent Application, a flow chart is plotted for each role, respectively. However, when an interaction between a role and another role is involved in plotting a flow chart, the behaviors of the two roles have to be involved simultaneously. Therefore, the behavior of a role cannot be described separately, which is disadvantageous to the simplification of the modeling procedure. Especially in the case of being unable to collect the two roles together, it is hard to preserve consistency in the information obtained from them.

A system and a method for enterprise workflow resource management are disclosed in U.S. Pat. No. 6,308,163, wherein the relations among respective roles are described macroscopically, however, the flow chart for each individual cannot be given, thereby the associations between respective messages and specific behaviors of respective individuals cannot be given, and the associations between respective behaviors of an individual and specific behaviors of other individuals cannot be given, either. Thus, this approach is not suitable for modeling complex systems.

SUMMARY OF THE INVENTION

A main technical problem to be solved by the present invention is how to simplify the modeling of a complex system and preserve consistency among information obtained from respective aspects at the same time. An object of the present invention is to provide a system modeling facilitating method and apparatus, which can facilitate users to collect descriptions of a complex system, and can preserve consistency among information fragments with different sources at the same time.

According to an aspect of the present invention, there is provided a system modeling facilitating method comprising the steps of recording entities and interactions among the entities introduced by users to form an abstract view consisting of the entities in an abstract form; building an associated sub-module for at least one of the entities; forming interfaces to other entities for each sub-module according to interactions involved by the respective associated entity of the sub-module; forming, in each of the sub-modules, representations of behaviors of its associated entity per se and logical relations among the behaviors, and building links between its respective interfaces and the representations of the corresponding behaviors of its associated entity.

Preferably, the system modeling facilitating method according to the present invention further comprises extending all sub-modules based on said abstract view, thereby automatically forming a global view.

Preferably, the system modeling facilitating method further comprises, when a change is made to a part of the view(s), automatically updating the module interfaces of other parts associated with the change. Preferably, said automatic updating comprises at least one of: when an interface is added, removed or modified for one sub-module, if associated sub-modules have been formed for other entities associated with the interface, automatically adding, removing or modifying corresponding interfaces in the associated sub-modules of the other entities accordingly; when an interaction is added, removed or modified between two entities, automatically adding, removing or modifying corresponding interfaces in the associated one/ones of the two entities for which associated sub-modules have been formed; when an entity is added or removed, if the associated sub-modules have been formed for other entities having interactions with the entity, automatically adding or removing corresponding interfaces in the associated sub-modules of the other entities accordingly.

Preferably, in the system modeling facilitating method according to the present invention, the process can jump among the respective steps at any time.

Preferably, a plurality of roles are introduced gradually starting from a critical entity in the system (human/roles, departments, systems, and so on).

According to another aspect of the present invention, there is provided a system modeling facilitating apparatus comprising: an input device for receiving information inputted by users; a storage device for storing the information inputted by users and received from the input device and diagram data formed by the facilitating apparatus; a display device for displaying various diagrams and data; an abstract view editor for editing an abstract view including entities inputted by users and interactions among the entities; a module framework generator for building an associated sub-module for at least one of the entities; an interface forming device for forming interfaces for each sub-module to other entities according to interactions involved by the respective entity associated with the sub-module; and, a module editor for forming, in each sub-modules, representations of behaviors of its associated entity per se and logical relations among the behaviors and building links between its respective interfaces and the representations of the corresponding behaviors of its associated entity.

Preferably, the system modeling facilitating apparatus according to the present invention further comprises an integrated process assembler for extending each sub-modules based on said abstract view, thereby forming a global view.

Preferably, the system modeling facilitating apparatus according to the present invention further comprises an interface automatic updating device for, when a change is made to a part in the views, said interface automatic updating device automatically updates module interfaces of other parts associated with the change.

According to still another aspect of the present invention, there is also provided a computer program product comprising a software code part executed to implement the system modeling facilitating method according to the present invention when said computer program product is running on a computer.

According to yet another aspect of the present invention, there is also provided a computer-readable recording medium on which a computer program is recorded, the computer program comprising a software code part executed to implement the system modeling facilitating method according to the present invention when said computer program product is running on a computer.

The system modeling facilitating method and apparatus according to the present invention have at least the following advantages:

1. The present invention provides a systematic method and corresponding supporting tools to facilitate business consultants to efficiently capture and model large-scale complex business processes by seamlessly integrating each work product generated in each step together.

2. The present invention effectively avoids the mismatch among interview records which possibly occurs, and guarantees that all local views can be assembled correctly together.

3. The method and apparatus of the present invention are very intuitive for business people and can serve as an effective communication tool to specify and confirm business process related requirements in a business transformation and engineering project.

4. The present invention also provides a mechanism to guarantee the interface consistency among different process fragments.

BRIEF DESCRIPTION OF THE DRAWINGS

The above and other objects, features and advantages of the present invention will become more apparent by describing the preferred embodiments of the present invention in detail taking in conjunction with the accompanying drawings, in which.

DESCRIPTION OF THE PREFERRED EMBODIMENTS

The system modeling facilitating method and apparatus according to the present invention are described below with reference to the accompanying drawings. The system modeling facilitating method and apparatus will be described in the following embodiments taking a business process system modeling as an example. However, those skilled in the art should understand that the present invention is absolutely applicable to the modeling of other systems.

Hereinafter, a method and apparatus for capturing and modeling a large-scale complex system based on roles according to the present invention are described taking a business process as an example.

Figure 1:
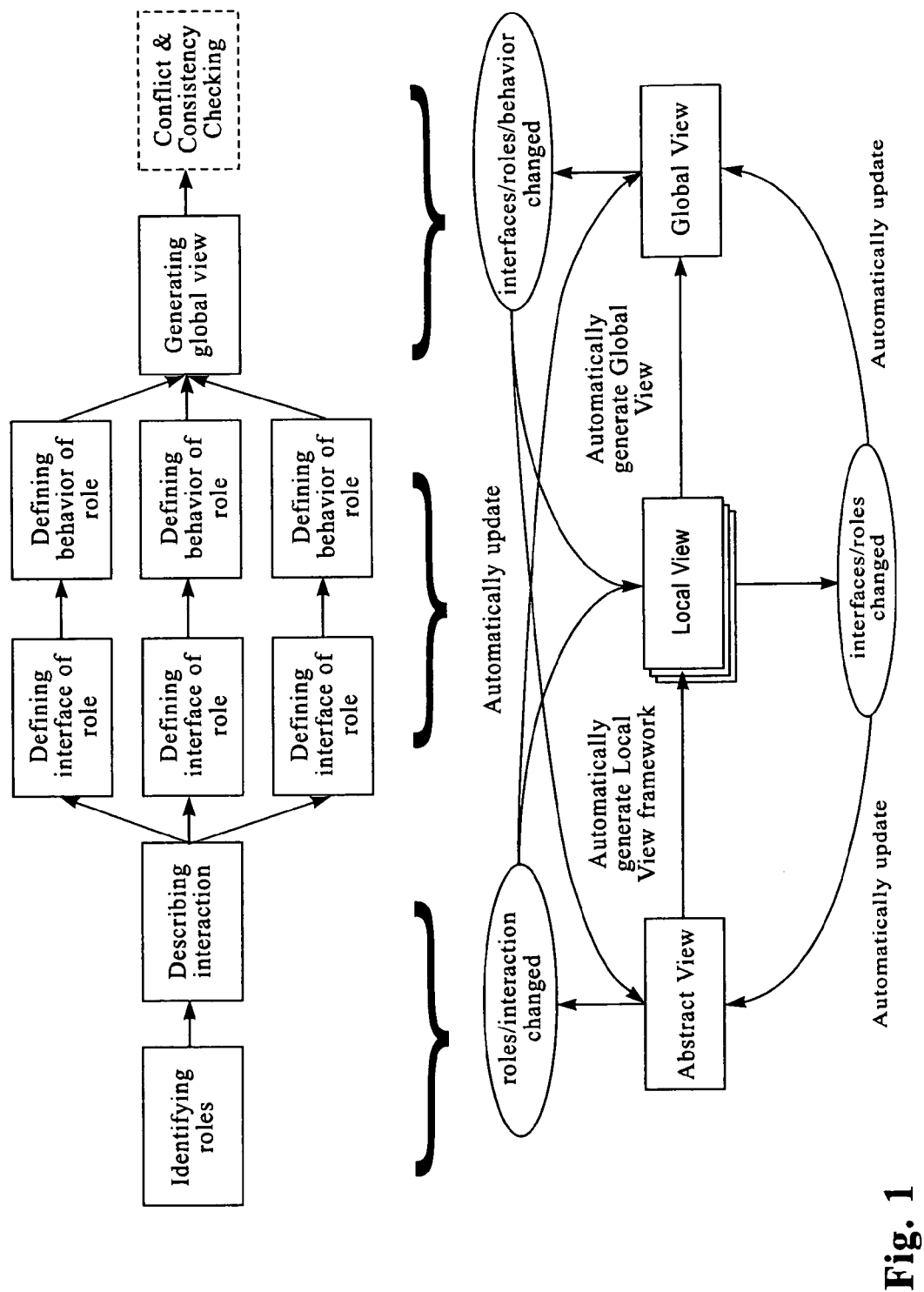
FIG. 1 schematically shows respective processes and products of the respective processes in the method according to the present invention on the whole.

FIG. 1 schematically shows the respective processes and the products of the respective processes in a method according to the present invention on the whole. As shown in FIG. 1, the system modeling facilitating method can be largely divided into three phases, and for each of the phases, a kind of view (i.e. an abstract view, a local view, or a global view) is generated. In the figure, one abstract view, plural local views and one global view are shown schematically. In fact, only the first two phases are necessary, that is, once the abstract view and the local views are generated, the working information of respective roles has been integrated together, and thus the task of business process modeling is completed basically. According to the generated abstract view and local views, behaviors of respective roles and logical relations among them in the business process can be captured clearly. After the global view is generated in a third phase, the entire business process, including its overall architecture and respective details, can be further captured comprehensively through this diagram. FIG. 1 shows the main process of the method according to the present invention with six steps. In fact, at any step, people can jump to other steps to change the corresponding view. Hereinafter, a more detailed description will be made to the system modeling facilitating method according to the present invention.

First, the system modeling facilitating method according to the present invention is briefly described with reference to FIG. 1.

In a first phase, starting from critical persons/roles, departments and systems (hereinafter may be collectively referred to as "roles"), more and more roles in the systems are identified at 102 and introduced gradually, and interactions among respective roles are described at 104. In this phase, an abstract view 110 which represents the overall architecture of the system is generated vividly.

Starting from the abstract view, local view frameworks can be generated automatically for several particular roles according to the requirements of users. In this phase, interfaces of the particular roles to other roles are defined automatically at 106 on their local view frameworks according to the interactions among respective roles described in the abstract view. Then, behaviors of the particular roles can be defined at 108. In a second phase, a plurality of local views 120 are generated, and the behaviors of each role per se are described.

When the local views are generated for necessary roles, a global view 130 can be generated automatically at 112 based on the interactions among roles described in the abstract view, starting from these local views. In the global view, the system to be modeled is reflected comprehensively from the whole to the details. The consistency and conflicts may be checked when necessary to guarantee the inerrable realization of system modeling.

Figure 2:
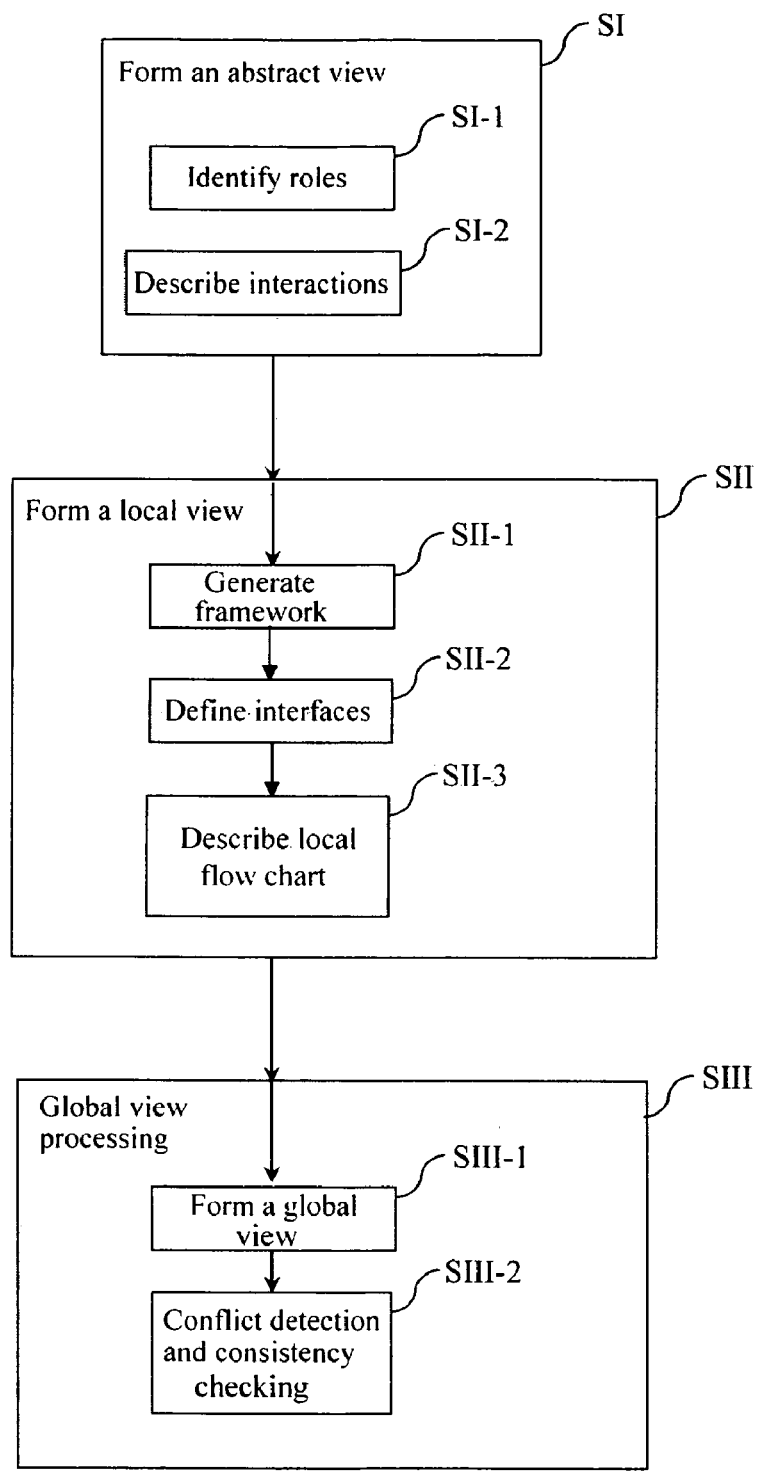
FIG. 2 shows a schematic flow chart of the method according to the present invention.

FIG. 2 shows a schematic flow chart of the method according to the present invention, wherein three large blocks show the three phases, and respective small blocks in the large blocks show sub-steps of the respective phases.

In the first phase SI, a high level entity relationship diagram, (i.e. an abstract view) is generated gradually from a single use case. In phase SI, the roles introduced by users and the interactions among the roles are recorded, whereby the abstract view is formed consisting of the roles in an abstract form. FIGS. 3a-3f detail a process for generating the abstract view.

Firstly, in step SI-1, roles/entities involved in the business process are identified. More and more roles may be introduced gradually, starting from a most original use case diagram. For the business process to be captured and modeled, a first role that triggers the process may be first introduced. It should be understood that any other critical entity in the system can be introduced first, and a plurality of other entities can be gradually introduced from the critical entity. For example, in FIG. 3, the first role is the consumer issuing a purchase order. He/she sends the order to an order handler. So the order handler should also been identified as another role. Then, roles interacting with the order handler, such as the financial department, the supply and marketing department, and so on (referring to FIG. 3b), can also be found out, and the financial department in turn may interact with a supplier and thus the supplier is identified as yet another role (referring to FIG. 3e). By following this way, all roles that possibly participate in the business process can be discovered. All these roles are represented as human-like icons (in the abstract form). It is to be understood that these roles can be represented by other forms of characters and symbols.

Figure 3A:
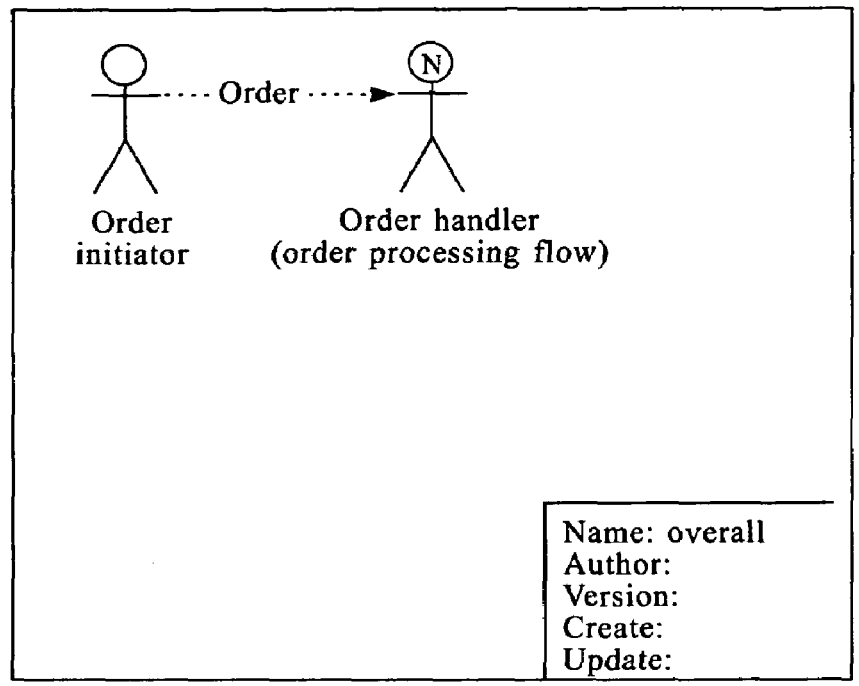
FIGS. 3a-3f are views exemplifying the process of generating an abstract view.
Figure 3B:
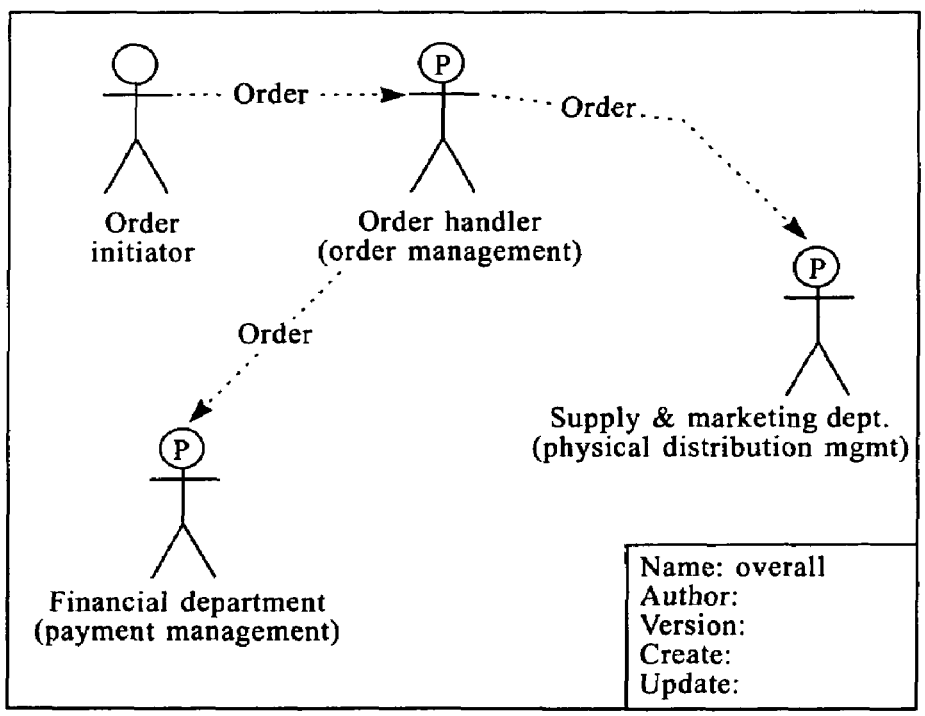

Subsequently, in step SI-2, the interactions among the roles are represented. FIGS. 3a and 3b representatively show interactions (orders) that may be represented when a new role is introduced, while FIGS. 3c and 3d further give the interactions among the introduced roles after the roles have been introduced. The interactions described herein are the interactions represented by data sent among respective roles. In this step, all interactions among the roles are identified and represented by arrows whose directions indicate flow directions for information data, (i.e. input or output). It should be understood that each role interacts with others by exchanging business artifacts. Here, the business artifact exchanged in each interacting process among the roles is recorded, a corresponding arrow is labeled with the exchanged business artifact, and thus the corresponding interaction is also labeled, in other words, the interaction is named. Thus, the interaction is transformed into an information-exchange-based interaction.

Figure 3C:
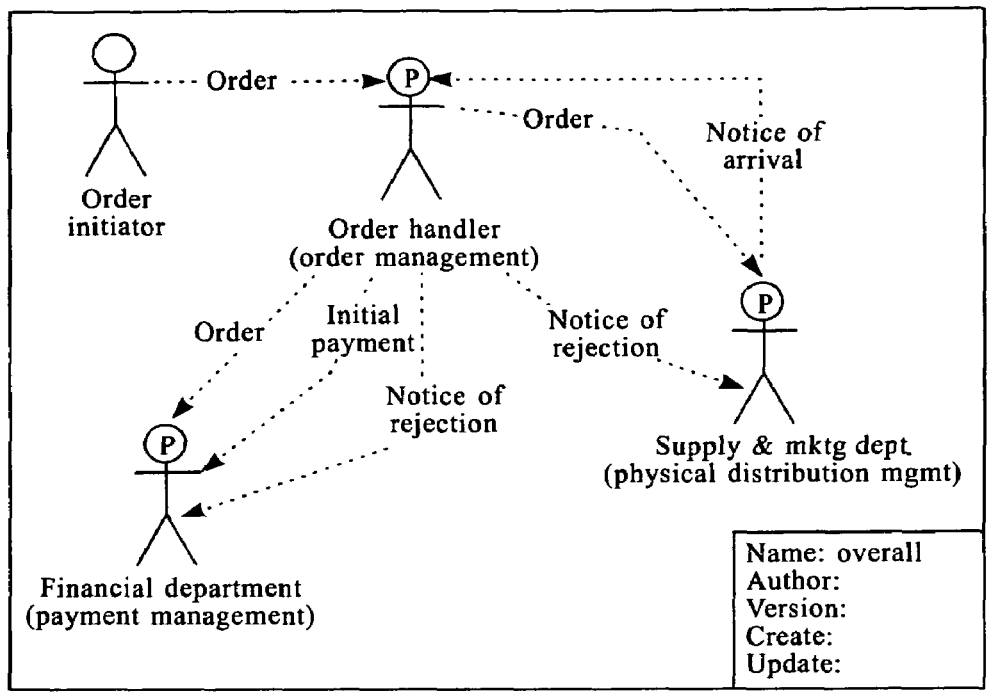
Figure 3D:
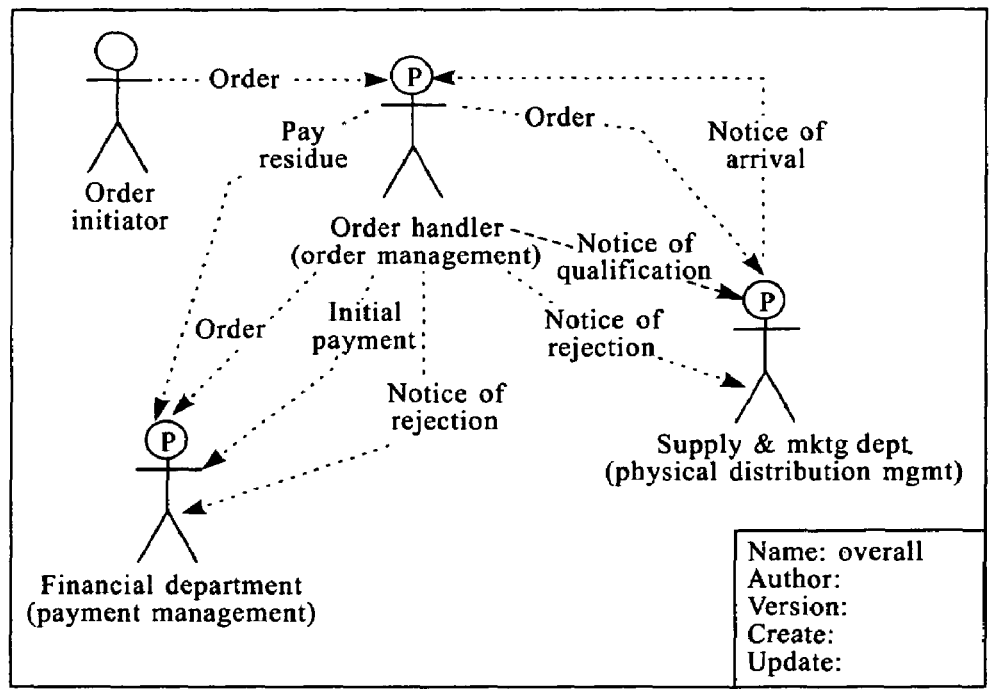
Figure 3E:
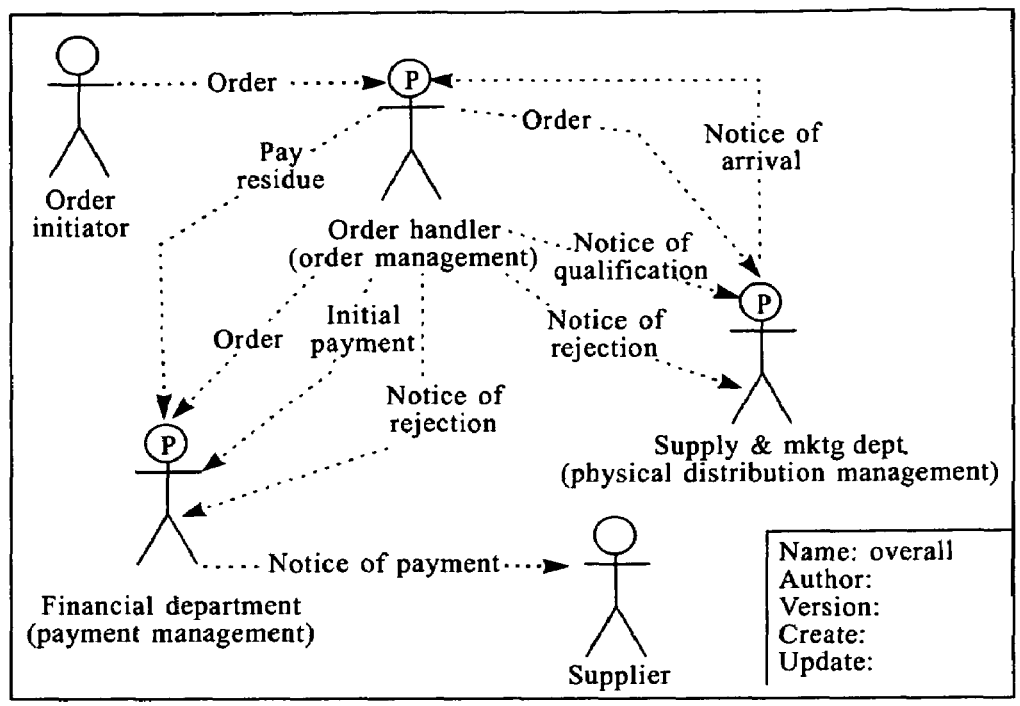
Figure 3F:
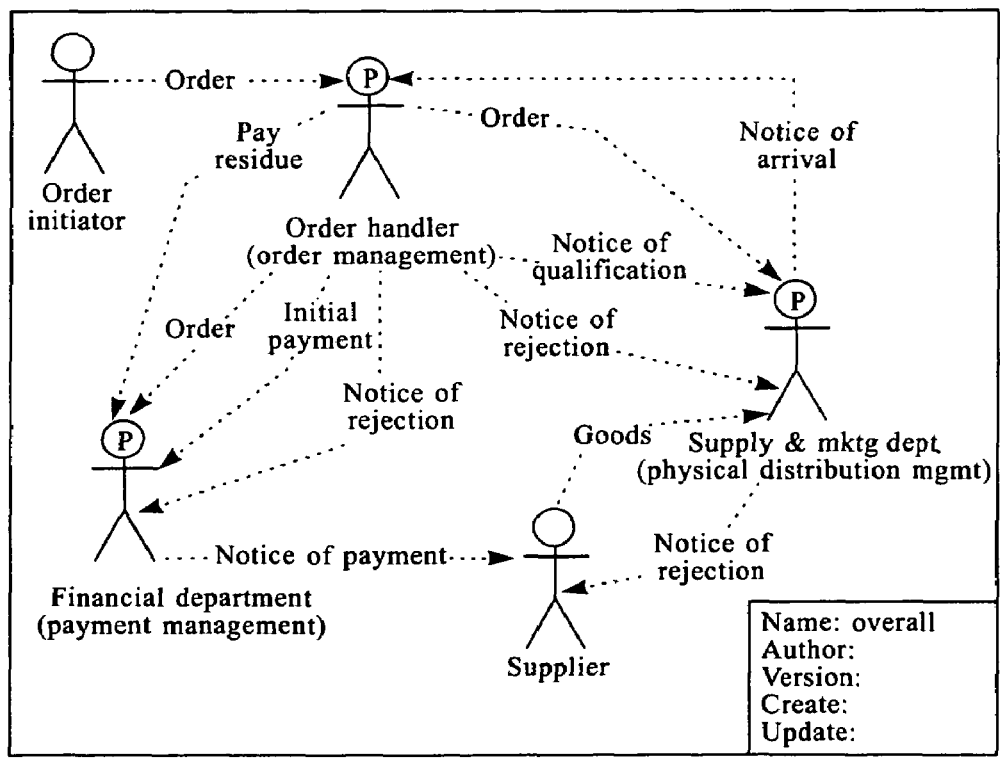

It can be seen that the processes of introducing roles and introducing their interactions can be performed in parallel, sequentially or alternatively. A new role can be introduced according to an interaction, and a new interaction can be introduced according to behaviors of a role. Therefore, in the first phase SI, the process of creating the abstract view is a gradual refinement process. Step SI-1 and step SI-2 can be performed cyclically and/or alternatively, and thus no arrow is used to represent the precedence relationship between step SI-1 and step SI-2 in FIG. 2 so as to indicate this point more explicitly. FIGS. 3a-3f show this gradual refinement process by way of example. While FIGS. 3a and 3b introduce plural roles through the flow of an order and introduce the aspect of interactions among the roles (i.e. an order transmission) at the same time; FIGS. 3c and 3d show a further description of the interactions among the introduced roles. FIG. 3e shows that a new role (i.e. a supplier) is introduced after further describing the interactions among the introduced roles; whereas FIG. 3f shows that the interactions between the new role and other roles such as the supply and marketing department are further described after the new role has been introduced.

The diagram obtained as such will include all related roles and high level information exchanged among them, and thus the diagram is called the abstract view.

In practice, business consultants can interview customer's management level to get an overall view. The management knows who does what task, but management may not know how they accomplish their respective task. Consequently, the overall architecture of the business process can be captured by interviewing the management, but details may not be captured.

Next, in the second phase SII, local views of the business process are generated from each role's perspective.

In step SII-1, a business process framework for a single role is generated automatically as a sub-module associated with the role. The sub-module is formed as a framework. It should be understood that the sub-module can be formed in many other suitable forms.

In addition, the manner of representing a role can be switched between abstract form and sub-module according to the user's requirement. There is a one-to-one correspondence relation between every role and its abstract form and its sub-module. When describing the behaviors of a role in detail, in other words, when interviewing a role, its representing manner is switched into sub-module, that is, it is extended from the abstract form to a module. Normally, only one role needs to be extended to form a sub-module, while other roles are represented in abstract form. Thus, the extended sub-module and the other roles represented in abstract form construct a local view associated with the sub-module (role), so as to describe the behaviors of the role corresponding to the sub-module and the interactions between the behaviors of the role and other roles. That is to say, an associated local view can be formed simultaneously when a sub-module is formed.

In step SII-2, interfaces of the role to other roles are defined automatically in the framework according to the interactions of the role which are described in the above abstract view (i.e., the high level entity relationship diagram). The information artifacts to be input and output are recorded, and the interfaces are labeled with the exchanged information. The interface definition makes sure that all role-based process pieces can be put together to create an integrated business process diagram.

Figure 4:
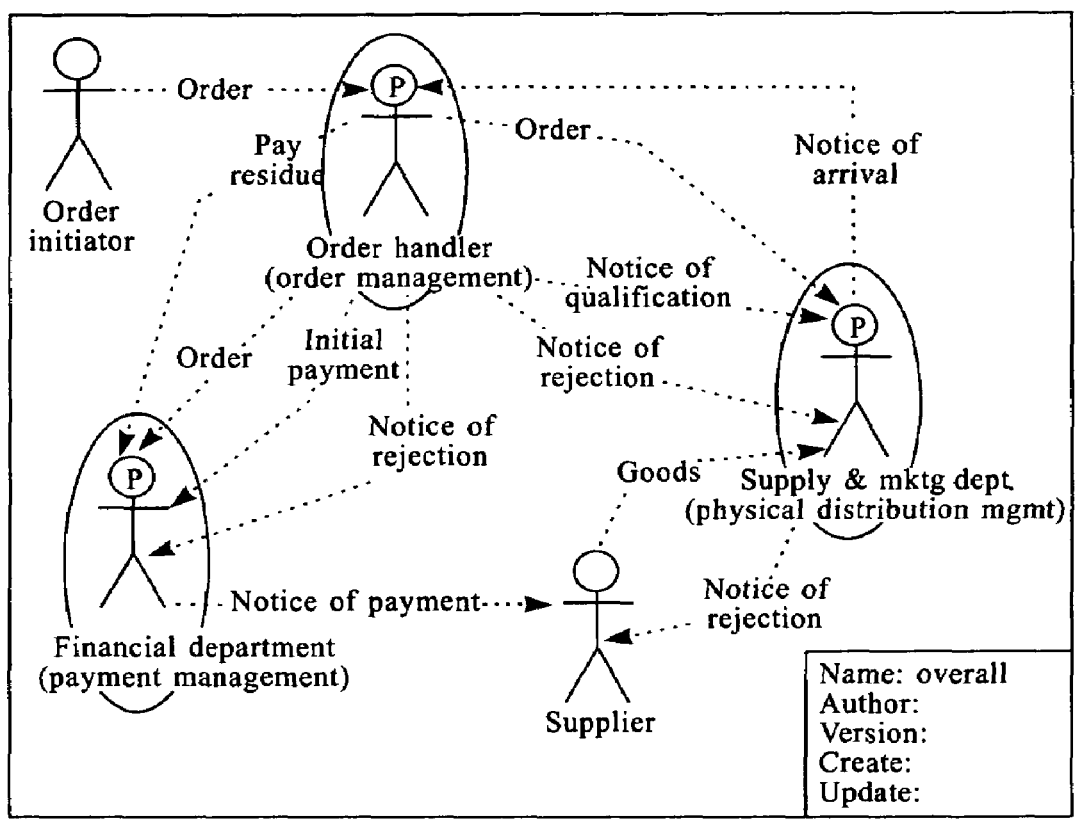
FIG. 4 schematically shows the manner of identifying roles to be interviewed and refined.
Figure 5A:
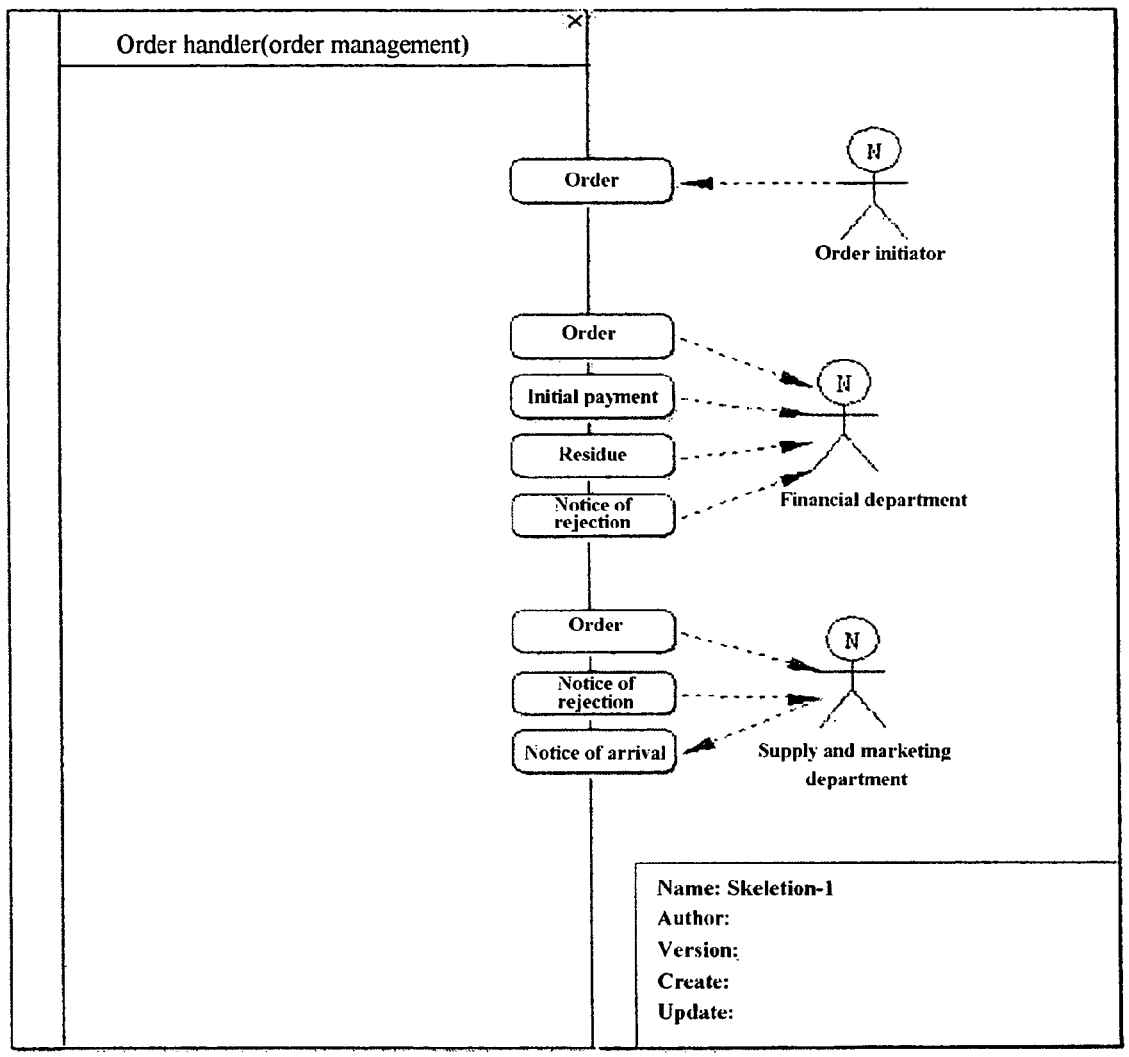
FIGS. 5a-5f are views schematically showing processes of generating local views.
Figure 5B:
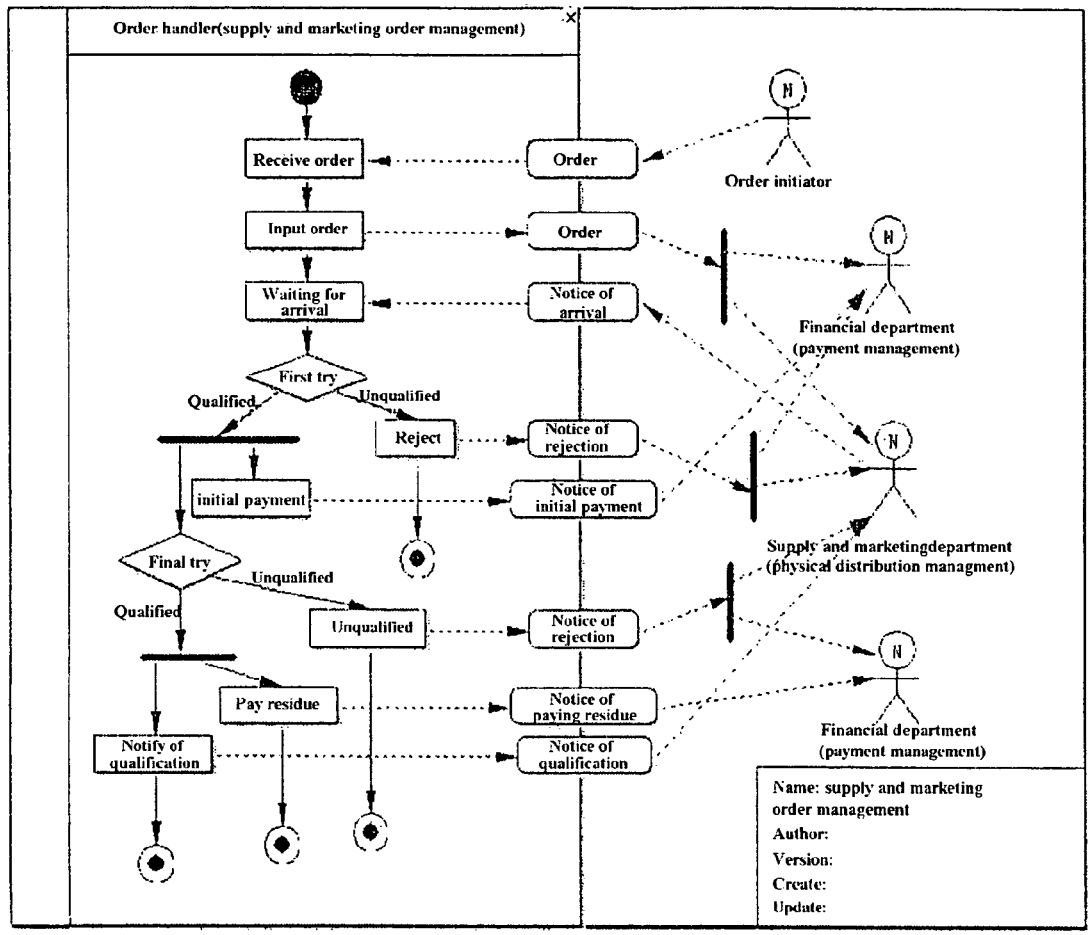
Figure 5C:
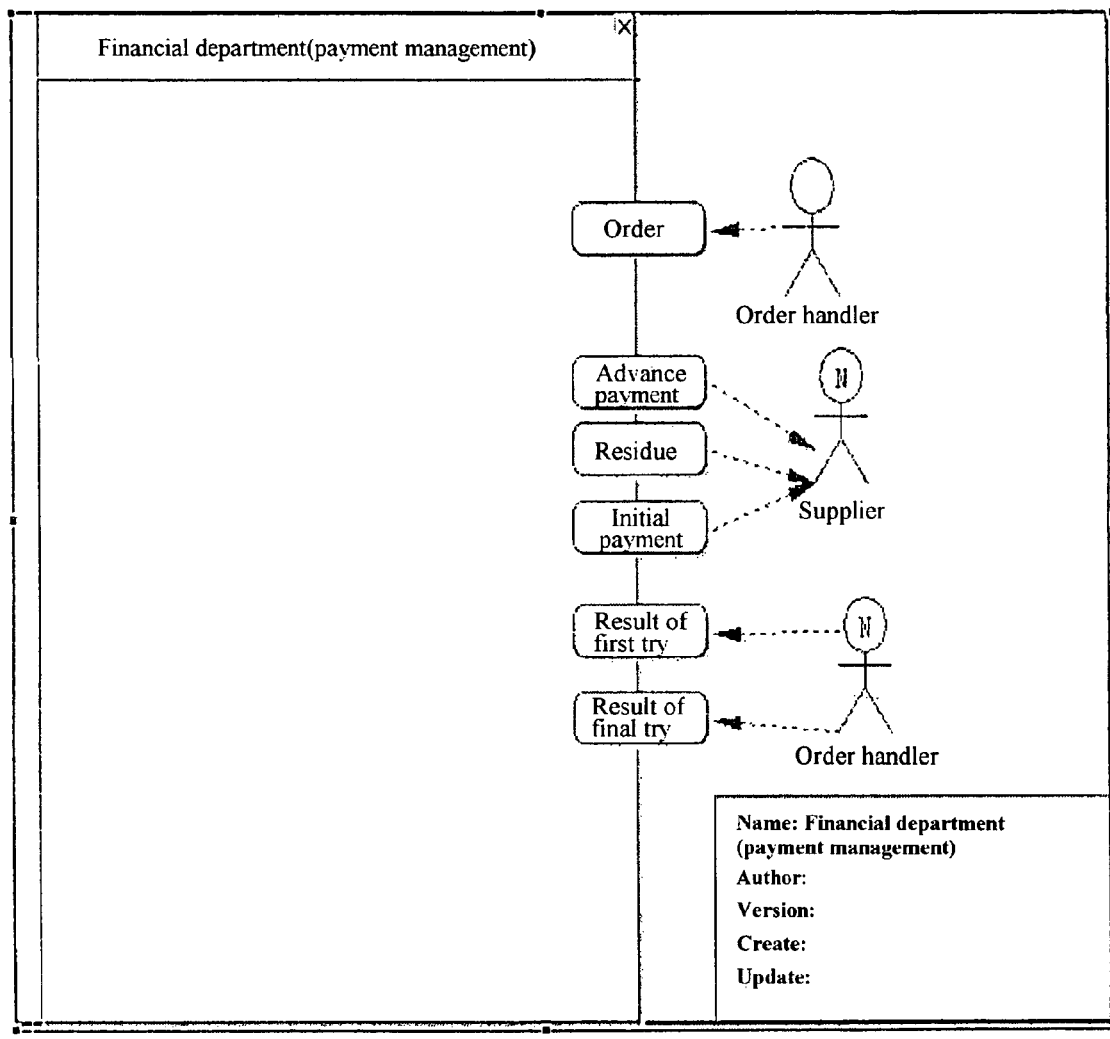
Figure 5D:
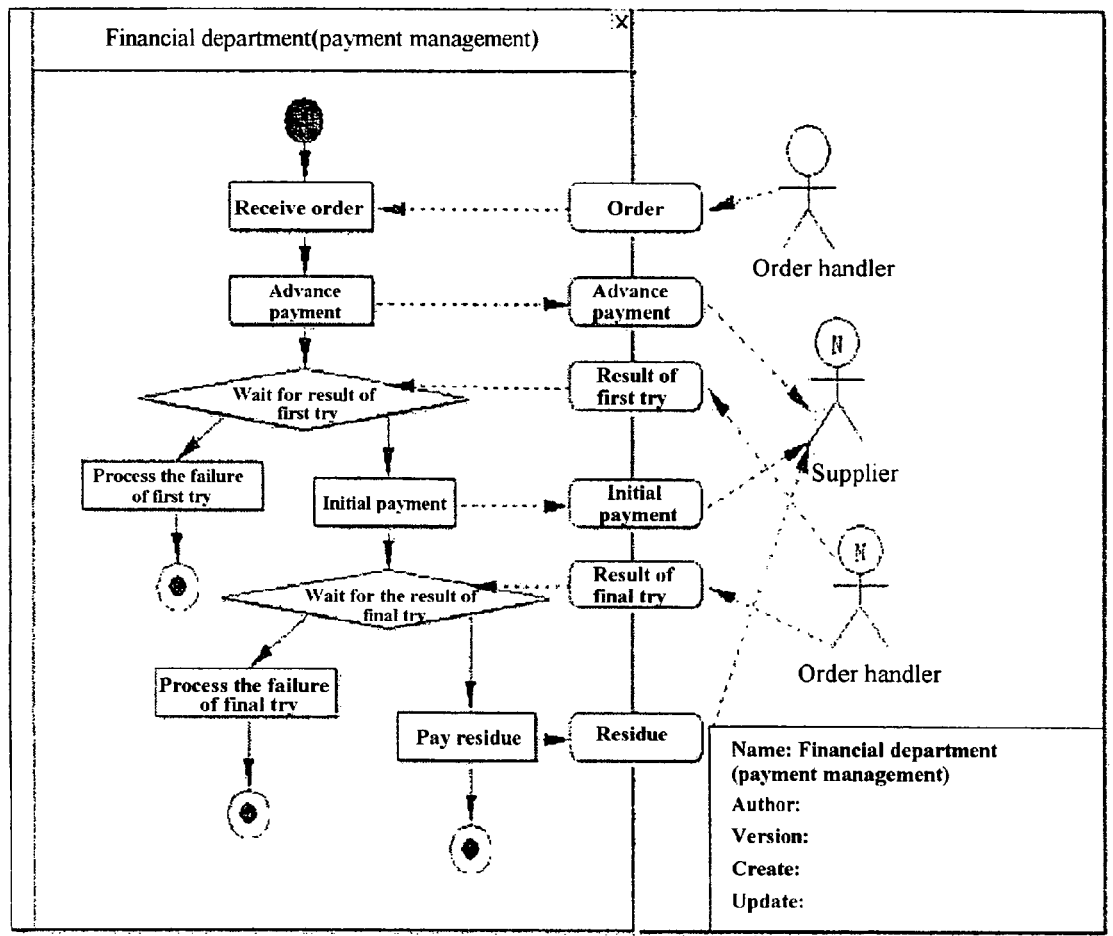
Figure 5E:
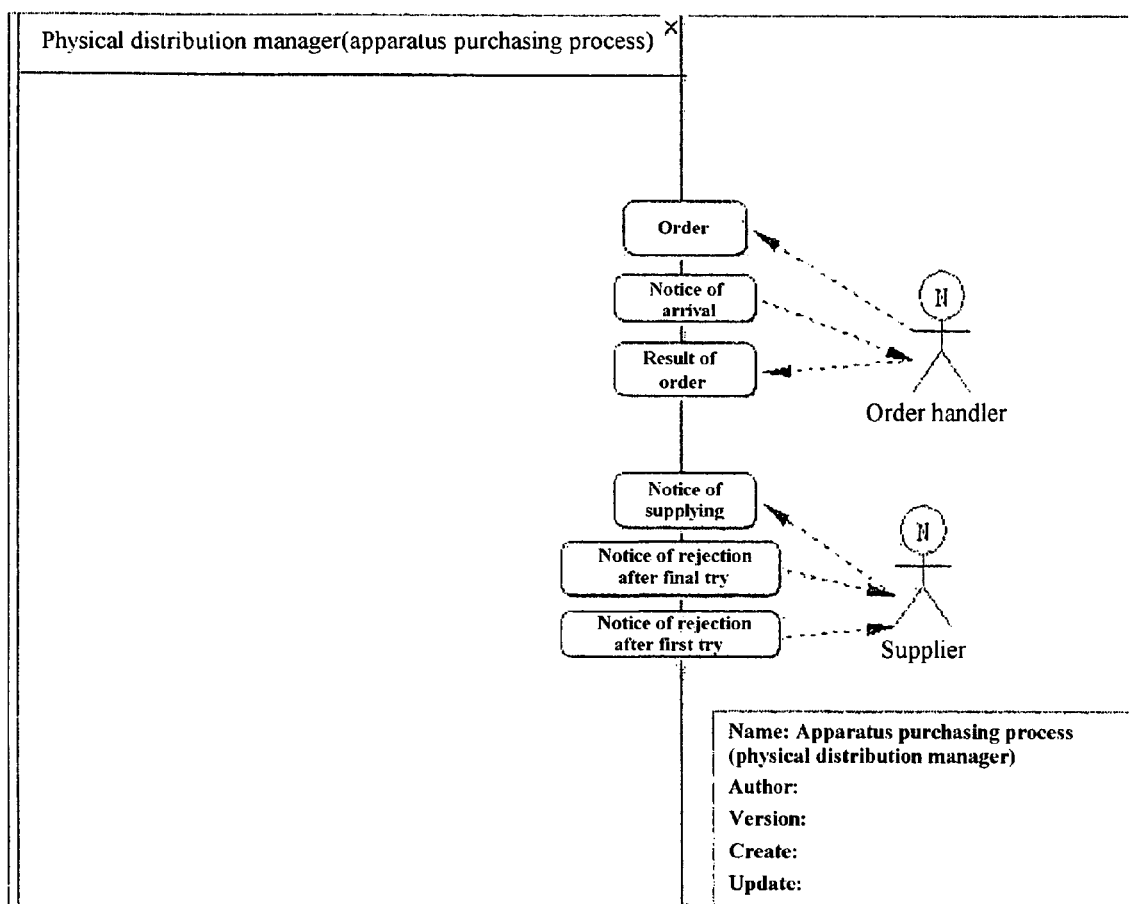
Figure 5F:
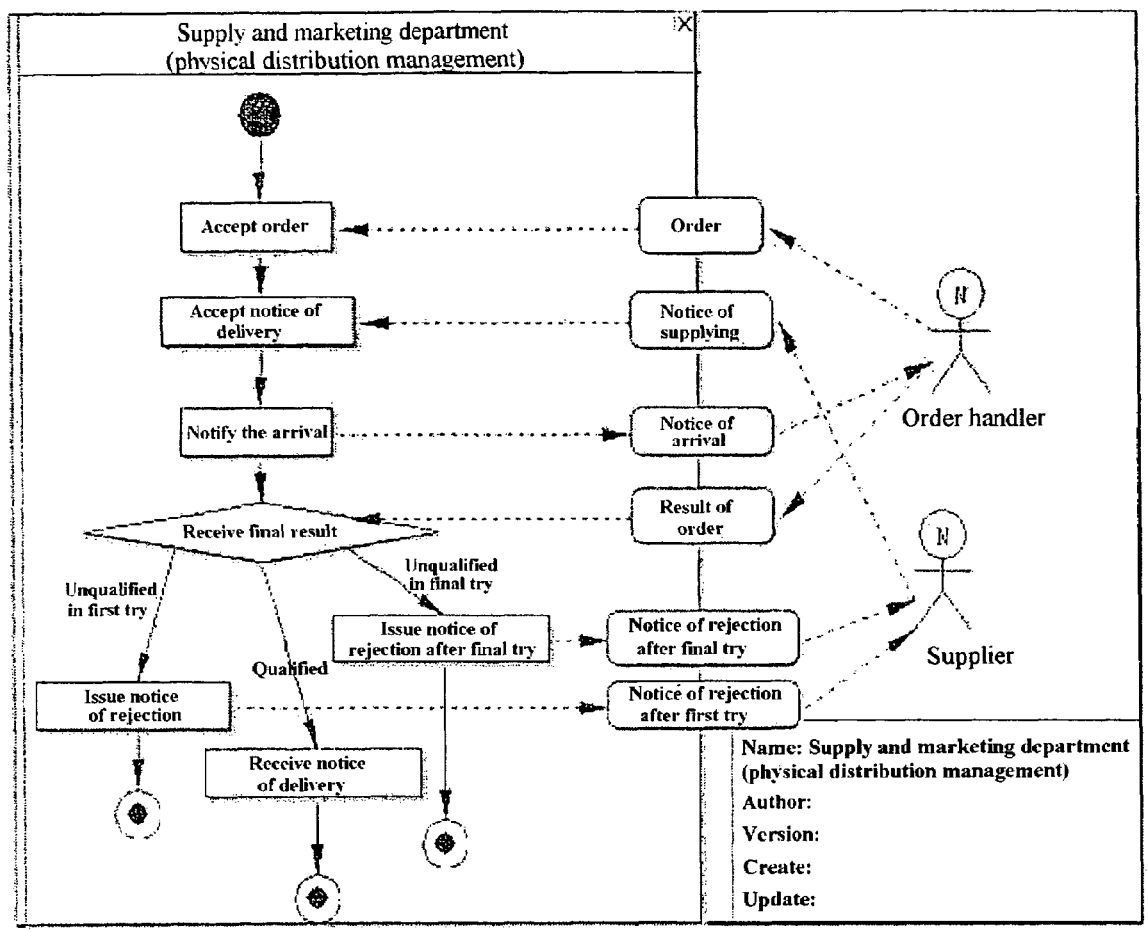

In practice, before generating the local view frameworks, one needs to identify which roles must be interviewed to refine their detailed behaviors. FIG. 4 schematically shows the manner of identifying roles to be interviewed and refined, where the identified roles, (as shown, the order handler, the financial department, the supply and marketing department), are surrounded by ellipses. FIGS. 5a-5f schematically show the processes of creating local views, wherein by way of an example, FIGS. 5a and 5b show how to create a local view relating to the order handler; FIGS. 5c and 5d show how to create a local view relating to the financial department; and FIGS. 5e and 5f show how to create a local view of the supply and marketing department. Once the roles to be interviewed for refining their detailed behaviors have been identified, local views can be formed for them, that is to say, they can be respectively extended from their abstract forms to sub-modules, except that there are no behavior descriptions in the module, as shown in FIGS. 5a, 5c, and 5e. In FIGS. 5a, 5c and 5e, the human-like icons standing for the roles in an abstract form are transformed into so-called "swimming lanes" (i.e., a framework). Their interactions associated with information inputs and outputs are transformed into parts outside the lanes. All of the exchanged information is represented on boundaries of the lanes and is connected with directed links which stand for receiving and sending. Taking the financial department as an example below, as shown in FIG. 5c, when the human-like icon standing for the financial department is selected in the abstract view, the human-like icon is transformed into a framework in which the behavior process of the financial department will be described subsequently; while the human-like icons standing for other roles are still placed outside the framework in the form of human-like icons. On the boundary of the framework, information received or sent by the financial department (e.g., order, advance payment, balance, result of a first try, result of a final try) is shown, which is used to define corresponding interfaces. These interfaces are connected with icons of other roles, and the flow directions of associated information are shown by arrows. For example, an order is received from the order handler and an advance payment notice is issued to the supplier.

In one local view, in other words, when one framework is being edited, other roles may remain in the abstract form (i.e., be represented by human-like icons rather than being extended to another local view or framework). Thus, users may be dedicated to modeling the role involved in this local view, such as performing operations associated with respective interface of the role (framework) and its behavior representation in the framework of the local view. The swimming lane with the exchanged information labeled on the boundary is just the interface of the role, and it is also the framework to model its behavior.

Additionally, in one local view, roles having no interactions with the roles described in the local view may not be shown, according to the interactions among roles shown in the abstract view. For example, the supplier having no interaction with the order handler is not shown in FIGS. 5a and 5b, the order initiator having no interaction with the financial department is not shown in FIGS. 5c and 5d, and the financial department and the order initiator having no interactions with the supply and marketing department are not shown in FIGS. 5e and 5f.

In step SII-3, a business process of each role's own is created based on the framework from its own perspective, whereby local views associated with its own behaviors are depicted. Here, the behaviors of a role are depicted in a manner of a work flow chart. However, it should be understood that the behaviors of a role can be depicted in other manners such as a state machine. Specifically, a role's business process is its internal behaviors and interactions between the role and other roles via its interface. The resulting diagram is thus a completed local view, as shown in FIGS. 5b, 5d and 5f. For example, behaviors are labeled in rectangular blocks or rhombic blocks, and respective blocks labeled with its behaviors are connected using arrow lines and the like to represent logical relations among these behaviors. Thus, the representations of the behaviors of the associated roles per se and the logical relations among the behaviors are formed in its framework as its own flow chart. The respective interfaces of the framework are connected with the blocks labeled with corresponding behaviors, and different arrow directions stand for sending or receiving information. Again using the financial department as an example, as shown in FIG. 5d, descriptions of behaviors of the financial department such as "receiving an order", "advance payment" etc. are given in the framework of its local view, and the sequence of steps is given by arrows, thereby a complete flow chart for the financial department per se is formed. At the same time, for each step, an interface defined by the information sent or received by the financial department in the step is connected with the step by arrows. For example, a step of "receiving an order" is connected with an interface "order", and an arrow points to the step of "receiving an order", which indicates that the financial department receives an order from outside (the order handler) in the step of receiving an order; while a step of "advance payment" is connected with an interface "advance payment", and an arrow points to the interface "advance payment", which indicates that the financial department issues a "advance payment" notice to outside (the supplier) in the step of advance payment.

In practice, consultants can interview each role, and collect the business process and an information structure from the local perspective of the single role. In the swimming lane (framework), only actions performed by the role are modeled to form its flow chart. While some actions may receive or send some artifacts, so these actions will be connected with corresponding information on the boundary. The directions of arrows indicate flow directions of signals (i.e., inputs or outputs). Here, a behavior model can be specified as a UML activity diagram or other flow chart.

As described above, the business process has been described completely after the abstract view and all necessary sub-modules (local views) are generated. Users can select one or more roles in an abstract form to extend them to the form of sub-modules (as long as sub-modules has been formed for them), so that the behaviors of the role and its interactions with other roles can be captured more clearly. Alternatively, the extended sub-modules can be recovered to human-like icons in the abstract form, and thus details of other roles and the overall relationship among the roles can be captured.

During the behavior modeling, an interface may be changed in a local view state. The confirmed changes will automatically update the abstract view. If the change is to add a new artifact linked with a certain role on the boundary, remove an information artifact or modify an information artifact, a corresponding interaction link is automatically added, removed or modified between the two roles in the abstract view. If the other role also has a local view, corresponding interface (information) is automatically added, removed or modified in the local view. On the other hand, when local views are formed for some roles, if an interaction is directly added, removed or modified between two roles in the form of abstract view (or in the case of at least the above two roles being represented by human-like icons), corresponding interfaces will be automatically added, removed or modified in the local views which correspond to the two roles. The automatically added, removed or modified interfaces in the local views will prompt the users to adjust behavior descriptions of the corresponding roles to adapt to this change. Thus, this mechanism guarantees a consistency among the respective local views.

Generally, in phase SIII, a global view of the complex business process is automatically generated under the guidance of the abstract view and the local views in order to capture the entire business process comprehensively.

Figure 6A:
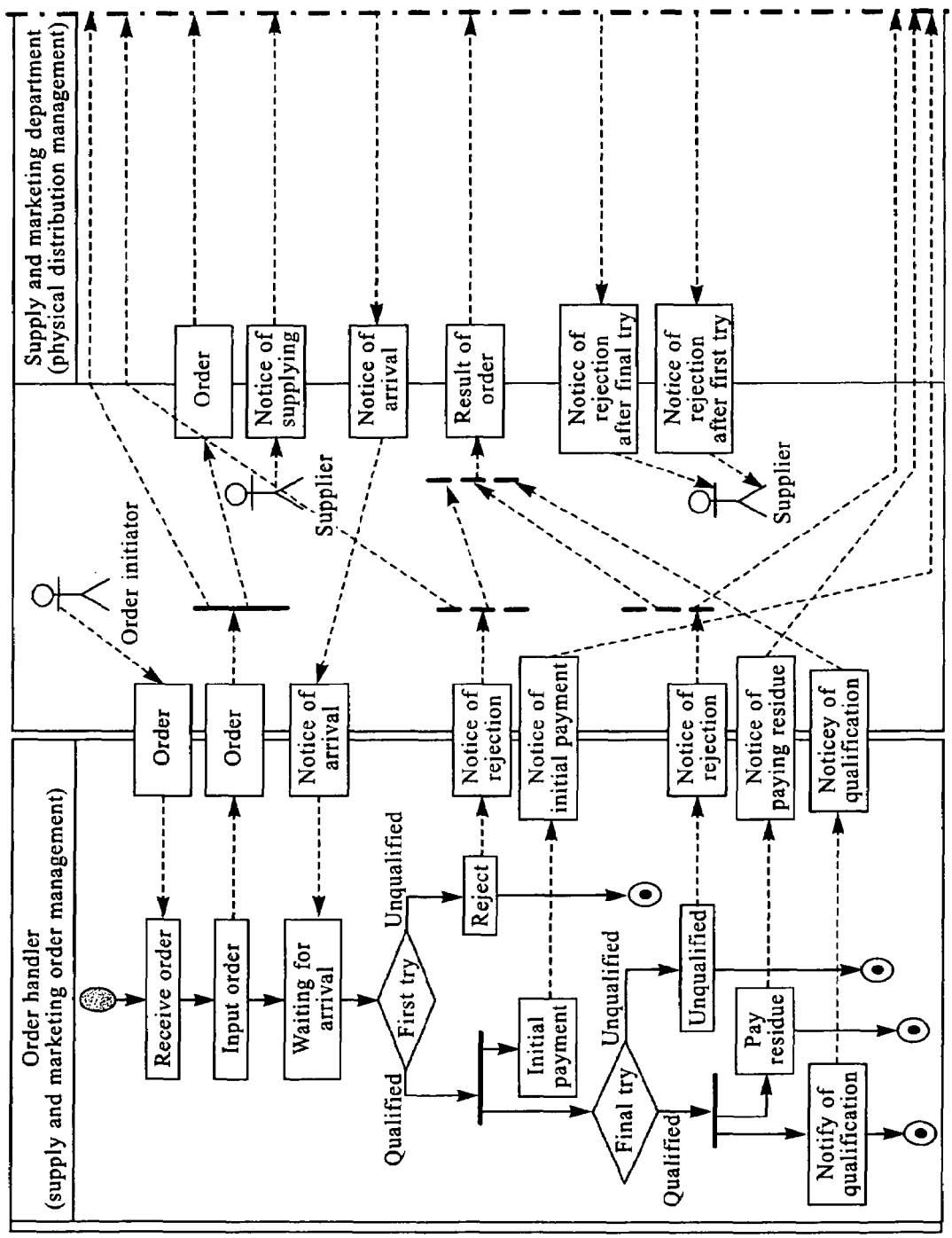
FIG. 6 is a view schematically showing a finally resulting integrated business process diagram.
Figure 6B:
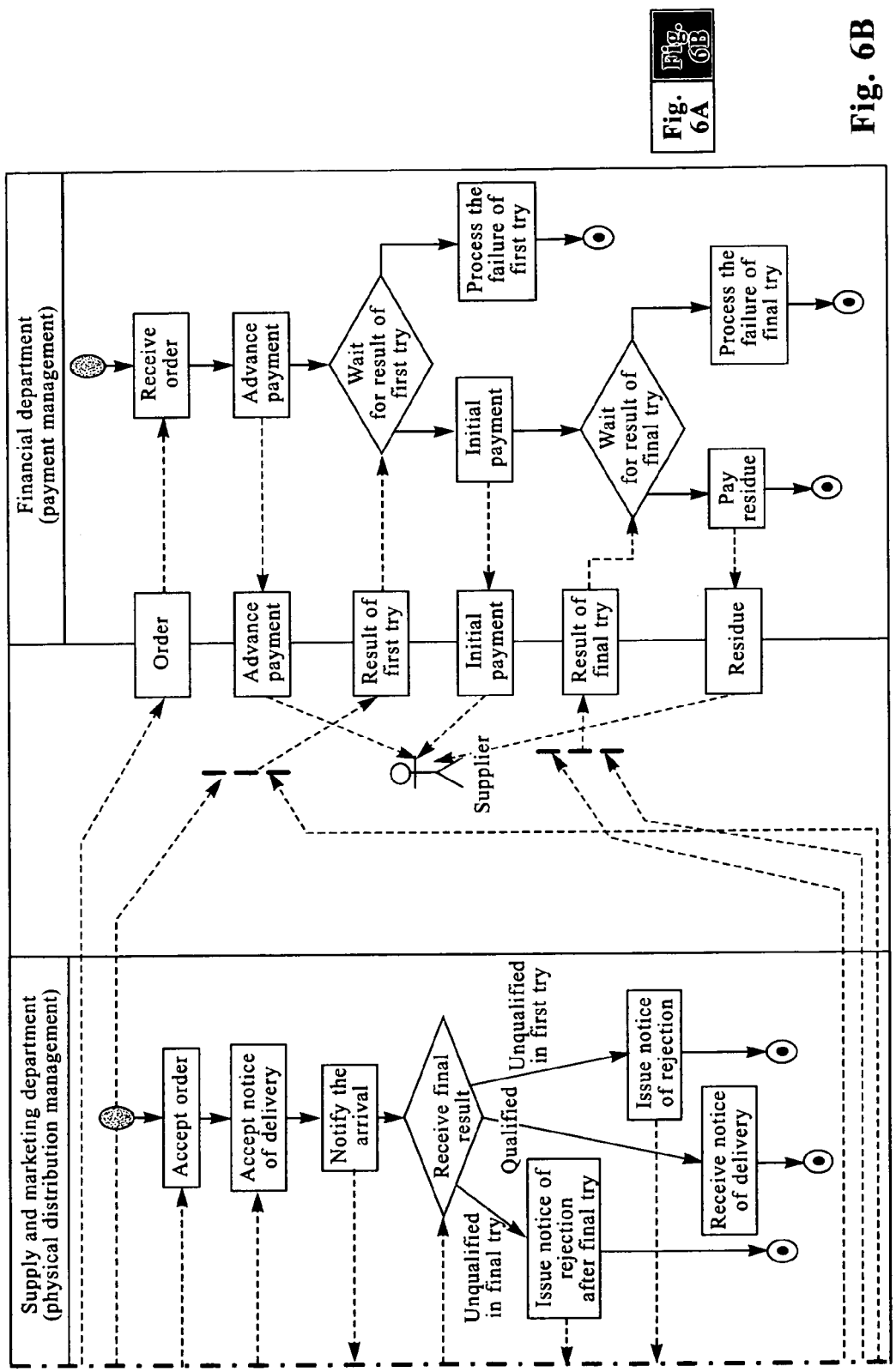

FIG. 6 schematically shows a final resulting integrated business process diagram. The local views relating to the order handler, the supply and marketing department and the financial department formed previously are all extended, and their flow charts are shown in their frameworks, respectively. Roles for which no local views are formed, such as the order initiator and the supplier etc., are still represented in the form of human-like icons. Dotted arrows among respective roles stand for interactions among the respective roles. With respect to roles for which local views have been formed, they are connected with other roles via arrows by interfaces defined with exchanged information and formed on the framework boundaries of their local views. With respect to the roles for which no local views are formed, all arrows standing for interactions directly point to the human-like icons representing the roles, or point to other roles or their interfaces starting from the human-like icons.

Specifically, in step SIII-1, based on the abstract view, all the local views are extended, thereby an integrated and comprehensive business process diagram is generated automatically. Therefore, the diagram obtained here is called a global view.

When multiple local views have been modeled, they can be automatically integrated together into the global view according to the interactions among the roles represented in the abstract view. In the global view, some roles still remain in the state of an abstract view. These roles can be extended on demand only if local views have been formed for them.

In the state of the global view, interface-related changes may also happen. Such changes are also allowed to be propagated through the abstract view to each individual local view. That is, when an interface exchanging information with another role is added, removed or modified for a role, if a corresponding local view has been formed for the other role, accordingly, a corresponding interface is automatically added, removed or modified in the local view of the other role. Alternatively, when an interaction is added, removed or modified directly between two roles, corresponding interfaces are automatically added, removed or modified in both of the local views corresponding to the two roles. The changes of interfaces in the local views may in turn trigger a further modification to their internal flow charts.

Up until now, the entire business process has been modeled by a role-based solution and its tools. Preferably, a conflict detection and consistency checking may be performed to check whether the expressions of the business process are correct and whether there is any syntax error and/or logical conflict among different roles in the state of the global view in step SIII-2.

As described above, the method according to the present invention can adjust interfaces of associated roles automatically at any time according to a change of an interface or an interaction made by the users, so as to prompt the users to adjust flow charts of the associated roles. Thus, it can be ensured that, in the case that respective roles cannot come together, the information fragments obtained by interviewing respective roles can be well integrated, and thus the entire system can be modeled orderly. Returning to FIG. 1, in the form of an abstract view, various changes can be made to the roles or interactions, and the local views and the global view can be updated automatically. In the form of local view, various changes can be made to the interfaces and roles, and the abstract view and the global view can be updated automatically. In the form of global view, various changes can be made to the interfaces, the roles or the behaviors, and the abstract view and the local views can be updated automatically. It can be seen that, the system modeling facilitating method according to the present invention is very flexible, and the users can even add a new role and a new interaction in the state of the local view or the global view, whereby the abstract view formed in the first phase SI will be updated automatically. That is, when a role is added or removed in the state of any of the views, if associated sub-modules have been formed for other roles having interaction with the role, corresponding interfaces are automatically added or removed in the associated sub-modules of the other roles accordingly.

Thus, the process may jump among respective phases and steps at any time without being limited to certain executing sequence. In practice, people can enter any of the phases at any time according to the requirements and execute the corresponding step.

Up until now, the system modeling facilitating method according to the present invention has been described taking a business process system as an example. However, as indicated hereinbefore, the present invention is absolutely applicable to facilitating the modeling of other systems, especially the modeling of a system in which information exchange is involved among different roles. The component entities of such a system correspond to the roles/entities and the like in the foregoing business process example. And, interactions among the roles can also be based on the data sent among them.

Hereinbefore, the system modeling facilitating method according to the present invention has been described taking a business process system as an example. However, it should be understood that the present invention per se does not relates to a business method, but is a method and apparatus for facilitating the modeling of various systems.

A system modeling facilitating apparatus according to the present invention is described below with reference to FIG. 7. Those skilled in the art will understand that not all components shown in the figure are indispensable technical features of the present invention.

Like a general system modeling facilitating apparatus, the system modeling facilitating apparatus according to the present invention also comprises an input device for receiving information inputted by users, a storage device for storing information inputted by users received from the input device, a display device for displaying various diagrams and data. These devices are not shown in FIG. 7.

Figure 7:
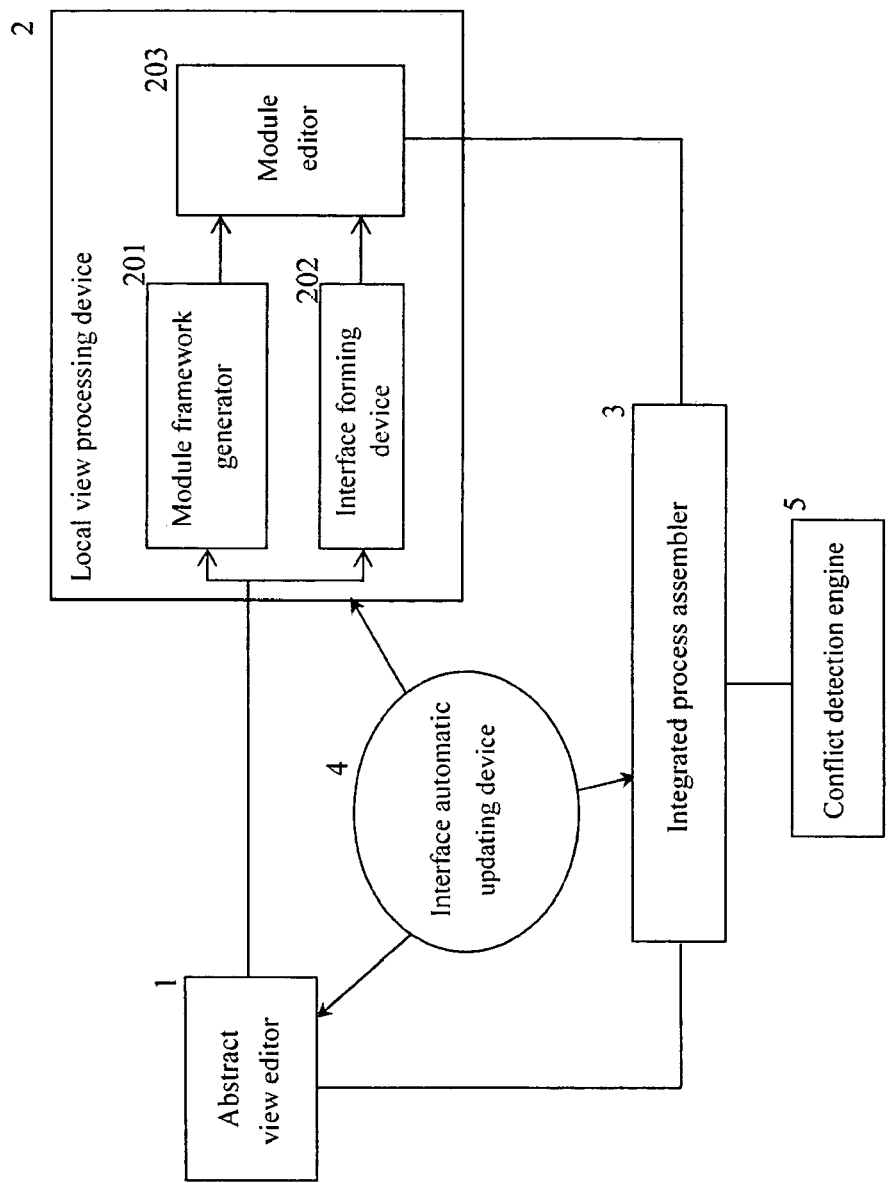
FIG. 7 shows a schematic block diagram of a system modeling facilitating apparatus according to the present invention.

As shown in FIG. 7, the system modeling facilitating apparatus according to the present invention further comprises an abstract view editor 1 for editing an abstract view including entities inputted by users and interactions among the entities, a local view processing device 2 for generating and editing local views, and a integrated process assembler 3 for extending respective sub-modules based on said abstract view to form a global view. In fact, a clear comprehensive expression of the entire system can be formed without the integrated process assembler 3.

The local view processing device 2 comprises a module framework generator 201 for building an associated sub-module for at least one of the entities; an interface forming device 202 for forming interfaces for each sub-module to other entities according to the interactions involved by the respective associated entity of the sub-module; a module editor 203 for forming, in each sub-module, representations of behaviors of its associated entity per se and logical relations among the behaviors, and building links between its respective interfaces and the representation of the corresponding behavior of its associated entity.

The system modeling facilitating apparatus according to the present invention may further comprise an interface automatic updating device 4 for automatically updating module interfaces of other parts associated with a change when the change is made to a part of the views. The particular updating manner is the same as the updating manner described when describing the system modeling facilitating method according to the present invention hereinbefore, and thus the description thereof is omitted here.

The system modeling facilitating apparatus according to the present invention may further comprise a conflict detection engine 5 for automatically checking whether there is any syntax error and/or logical conflict among different entities in the global view.

Additionally, the system modeling facilitating method according to the present invention may be implemented by a computer program product, the computer program product comprising a software code part executed to implement the system modeling facilitating method according to the present invention when said computer program product is running on a computer.

The present invention may also be implemented by recording a computer program in a computer-readable recording medium, the computer program comprising a software code part executed to implement the system modeling facilitating method according to the present invention when said computer program is running on a computer. That is, the process of the system modeling facilitating method according to the present invention can be distributed in the form of instructions in a computer-readable medium and other forms regardless of the particular type of signal bearing media actually used to carry out the distribution. Examples of the computer-readable media include media such as EPROM, ROM, magnetic tape, paper, floppy disk, hard disk drive, RAM and CR-ROM, and transmission-type media such as digital and analog communication links.

Although the present invention has been particularly shown and described with reference to the preferred embodiments thereof, those skilled in the art should understand that various modifications can be made in form and details therein without departing from the spirit and scope of the present invention as defined in the appended claims.

What is claimed is:

1. A computer-implemented system modeling facilitating method for execution at a computer processing system having at least one processing device and a graphical user interface with a display, comprising the steps of:
   recording at said graphical user interface a plurality of entities and interactions among the entities introduced by users to form an abstract view comprising said entities in an abstract form; and
   said processing device performing steps of:
   building a plurality of sub-modules comprising a sub-module for each of a plurality of entities, each sub-module comprising a process framework for a respective entity;
   forming interfaces to other entities for each sub-module based on interactions of the respective entity of the sub-module;
   forming, in each sub-module, representations of behaviors of the respective entity and logical relations among the behaviors, and building links between the interfaces to other entities and the representations of behaviors; and
   automatically combining the plurality of sub-modules depicted in a local view based on the interactions described in the abstract view to automatically generate a global view for display at said graphical user interface.

2. The system modeling facilitating method of claim 1, wherein said other entities are represented in the abstract form, and wherein the sub-module and the other entities represented in the abstract form construct a local view associated with the sub-module.

3. The system modeling facilitating method of claim 1, further comprising automatically checking for at least one of a syntax error and a logical conflict among entities in the global view.

4. The system modeling facilitating method of claim 1, further comprising, when a change is made to a part of a view, automatically updating interfaces to other entities associated with the change.

5. The system modeling facilitating method of claim 4, wherein said automatic updating comprises at least one of:
   when an interface is added, removed or modified for one sub-module, if associated sub-modules have been formed for other entities associated with the interface, automatically adding, removing or modifying corresponding interfaces in the associated sub-modules of the other entities accordingly;
   when an interaction is added, removed or modified between two entities, automatically adding, removing or modifying corresponding interfaces in sub-modules of the entities for which associated sub-modules have been formed;
   when an entity is added or removed, if associated sub-modules have been formed for other entities having interactions with the entity, automatically adding or removing corresponding interfaces in the associated sub-modules of the other entities accordingly.

6. The system modeling facilitating method of claim 1, wherein said step of forming the abstract view further comprises recording information exchanged in interactions among the entities, and transforming said interactions into information-exchange-based interactions, wherein interfaces of the entity are formed according to said information-exchange-based interactions associated with the entities, thereby the interfaces are labeled with the exchanged information.

7. The system modeling facilitating method of claim 6, further comprising labeling said interfaces with the exchanged information and wherein said step of transforming interactions comprises naming the interactions with the exchanged information.

8. The system modeling facilitating method of claim 1, further comprising recovering the sub-modules to be represented in the abstract form.

9. The system modeling facilitating method of claim 1, further comprising the steps of:

receiving user selection input of one or more selected entities; and automatically switching between display of a selected sub-module for the one or more selected entities and display of the abstract form for the one or more selected entities based on the user selection input.

10. The system modeling facilitating method of claim 1, wherein said system is a business process system, said entities are various roles in the business process, and said interactions are based on data sent among the roles.

11. The system modeling facilitating method of claim 1, wherein the representations of the behaviors of the respective entity associated with a sub-module and the logical relations among the behaviors comprises one of a work flow chart and a state machine of the respective entity.

12. The system modeling facilitating method of claim 1, wherein a plurality of entities are introduced for modeling starting from a step of identifying a first critical entity of the system.

13. A computer-readable recording medium on which a computer program is recorded, the computer program comprising a software code part executed to implement the method of claim 1 when said computer program is running on a computer.

14. A system modeling facilitating apparatus, comprising:

an input device for receiving information input by users, said information comprising entities and interactions among entities of a system;

a storage device for storing information input by users and received from the input device, and diagram data formed by the system modeling facilitating apparatus;

a display device for displaying information and diagram data;

an abstract view editor for editing an abstract view, said view comprising entities and interactions among the entities;

a module framework generator for building a sub-module for at least one of the entities, each sub-module being associated with a respective entity;

an interface forming device for forming interfaces for each sub-module to other entities based on interactions of the respective entity associated with the sub-module;

a module editor for forming, in each sub-module, representations of behaviors of the respective entity and logical relations among the behaviors, and building links between the interfaces to other entities and the representation of the behaviors; and wherein said model framework generator automatically builds a plurality of sub-modules and further comprising an integrated process assembler for integrating the plurality of sub-modules depicted in a local view based on the interactions described in said abstract view to automatically form a global view.

15. The system modeling facilitating apparatus of claim 14, further comprising a conflict detection engine for automatically detecting at least one of a syntax error and logical conflict among different entities in the global view.

16. The system modeling facilitating apparatus of claim 14, further comprising an interface automatic updating device for, when a change is made to a part of said view, said interface automatic updating device automatically updates interfaces to other entities associated with the change.

* * * * *